US008419343B2

(12) United States Patent
Huang et al.

(10) Patent No.: US 8,419,343 B2

(45) Date of Patent: Apr. 16, 2013

(54) SOUND FILM ADSORPTION DEVICE

(75) Inventors: Cheng-hsin Huang, Tu Cheng (TW); Feng-chi Lee, Tu Cheng (TW); Pei-cheng Wu, Tu Cheng (TW)

(73) Assignee: Cheng UEI Precision Industry Co., Ltd., Tu Cheng, Taipei (TW)

( * ) Notice: Subject to any disclaimer, the term of this patent is extended or adjusted under 35 U.S.C. 154(b) by 404 days.

(21) Appl. No.: 12/848,163

(22) Filed: Jul. 31, 2010

(65) Prior Publication Data

US 2012/0027556 A1 Feb. 2, 2012

(51) Int. Cl.
*B23Q 16/06* (2006.01)
*B23P 19/04* (2006.01)

(52) U.S. Cl.
USPC .... 414/797; 414/744.2; 414/589; 414/222.05

(58) Field of Classification Search .................... 269/21; 355/76; 369/30.55; 414/22.04, 222.05, 222.06, 414/226.04, 744.1, 744.2, 744.3, 744.6, 744.7, 414/744.8, 749.6, 796.9, 797
See application file for complete search history.

(56) References Cited

U.S. PATENT DOCUMENTS

| | | | | | |
|---|---|---|---|---|---|
| 2,652,161 | A | * | 9/1953 | Herzig et al. | 414/796 |
| 3,757,963 | A | * | 9/1973 | Binkley | 414/564 |
| 3,881,607 | A | * | 5/1975 | Lewis | 414/618 |
| 4,024,963 | A | * | 5/1977 | Hautau | 414/795.3 |
| 4,545,675 | A | * | 10/1985 | Luscher | 355/76 |
| 4,607,536 | A | * | 8/1986 | Lawson et al. | 73/863.91 |
| 4,676,710 | A | * | 6/1987 | Shiraishi | 414/223.01 |
| 5,470,195 | A | * | 11/1995 | Blank et al. | 414/797 |
| 5,819,954 | A | * | 10/1998 | Lacriola | 209/563 |
| 2004/0109751 | A1 | * | 6/2004 | Whitcomb et al. | 414/744.1 |

* cited by examiner

*Primary Examiner* — Gregory Adams
(74) *Attorney, Agent, or Firm* — Cheng-Ju Chiang

(57) ABSTRACT

A sound film adsorption device includes a bracket, which has a platform on which a sound film collect, which forms a chamber for receiving a sound film, is installed. A rotary mechanism includes a supporting post retained on the platform, a rotary plate in the form of a cantilever-shape having an end moveably coupled to the supporting post and an opposite end serving as an open end, and a spring member coupled with the supporting post to support between the platform and the rotary plate. A first absorbing mechanism includes a first vacuum generator and an absorbing head. The absorbing head has an end communicated with the first vacuum generator, and the other end extended through the open end of the rotary plate to align with the chamber of the sound film collect so as to absorb the sound film placed within the sound film collect.

16 Claims, 5 Drawing Sheets

SOUND FILM ADSORPTION DEVICE

BACKGROUND OF THE INVENTION

1. Field of the Invention

The present invention relates to a separating apparatus, and more particularly, to a sound film adsorption device.

2. Description of the Prior Art

In the sound product manufacturing process, since the sound films are made by mass production, a great amount of sound films are overlaid for the convenience on delivery after manufactured. Those great-overlaid sound films need separated from each other when proceeding to a next processing step. A prior sound film separating approach is widely manipulated by a manual separation. Nevertheless, since sound film is an extremely thin slice-like object, the manual manipulation is hard to accomplish the individual separation from the sound films. Usually, there is several overlaid sound films found even after separated. Moreover, since the manual manipulation is hard to control a force of touching the sound film, it is possible to invoke the sound film structure easily damaged and affect qualification.

BRIEF SUMMARY OF THE INVENTION

One object of the present invention is to provide a sound film adsorption device for solving the drawback of the prior technology, which is capable of efficiently separating the sound films from the above and ensuring the qualification of the sound films.

To accomplish the above invention object, the present invention provides a sound film adsorption device which includes a bracket, a sound film collect, a rotary mechanism and a first absorbing mechanism. Meanwhile, the bracket has a platform, and the sound film collect is installed on the platform and formed with a chamber where a sound film is placed. The rotary mechanism includes a supporting post, a rotary plate and a spring member, wherein said supporting post is retained on said platform and the cantilever-shaped rotary plate includes an end moveably coupled to the supporting post and the other end as an open end. The spring member is coupled with the supporting post to abut against between the platform and the rotary plate. The first absorbing mechanism includes a first vacuum generator and an absorbing head, wherein the absorbing head has an end communicated with the first vacuum generator, and the other end extended through the open end of the rotary plate to be aligned with the chamber of the sound film collect so as to absorb the sound film placed within the sound film collect. As the aforementioned, the sound film adsorption device according to the present invention utilizes a vacuum absorption approach to create a better efficiently separation effect and ensure the qualification of the sound film.

BRIEF DESCRIPTION OF THE DRAWINGS

The present invention may best be understood through the following description with reference to the accompanying drawings, in which.

DETAILED DESCRIPTION OF THE INVENTION

The advantages and novel features of the invention will become more apparent from the following detailed description of a preferred embodiment when taken in conjunction with the accompanying drawings.

Figure 1:
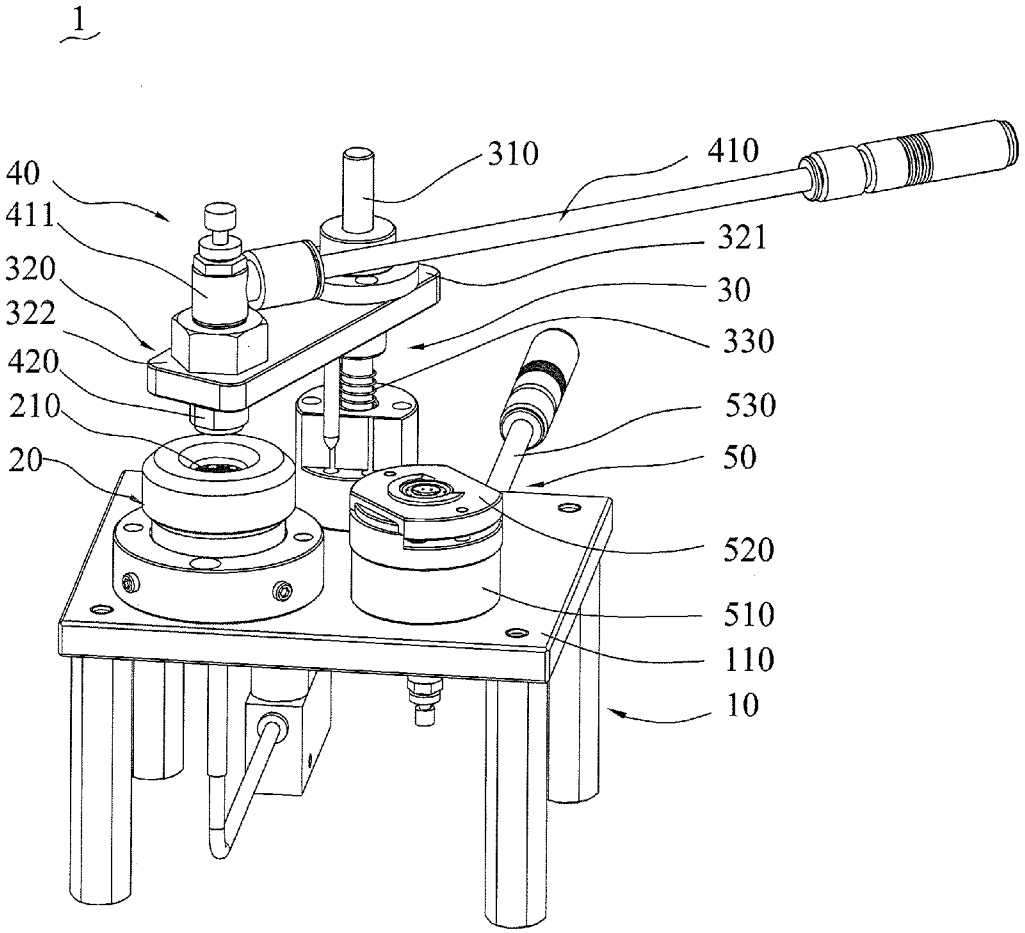
FIG. 1 illustrates a stereogram of a sound film adsorption device of an embodiment according to the present invention.
Figure 2:
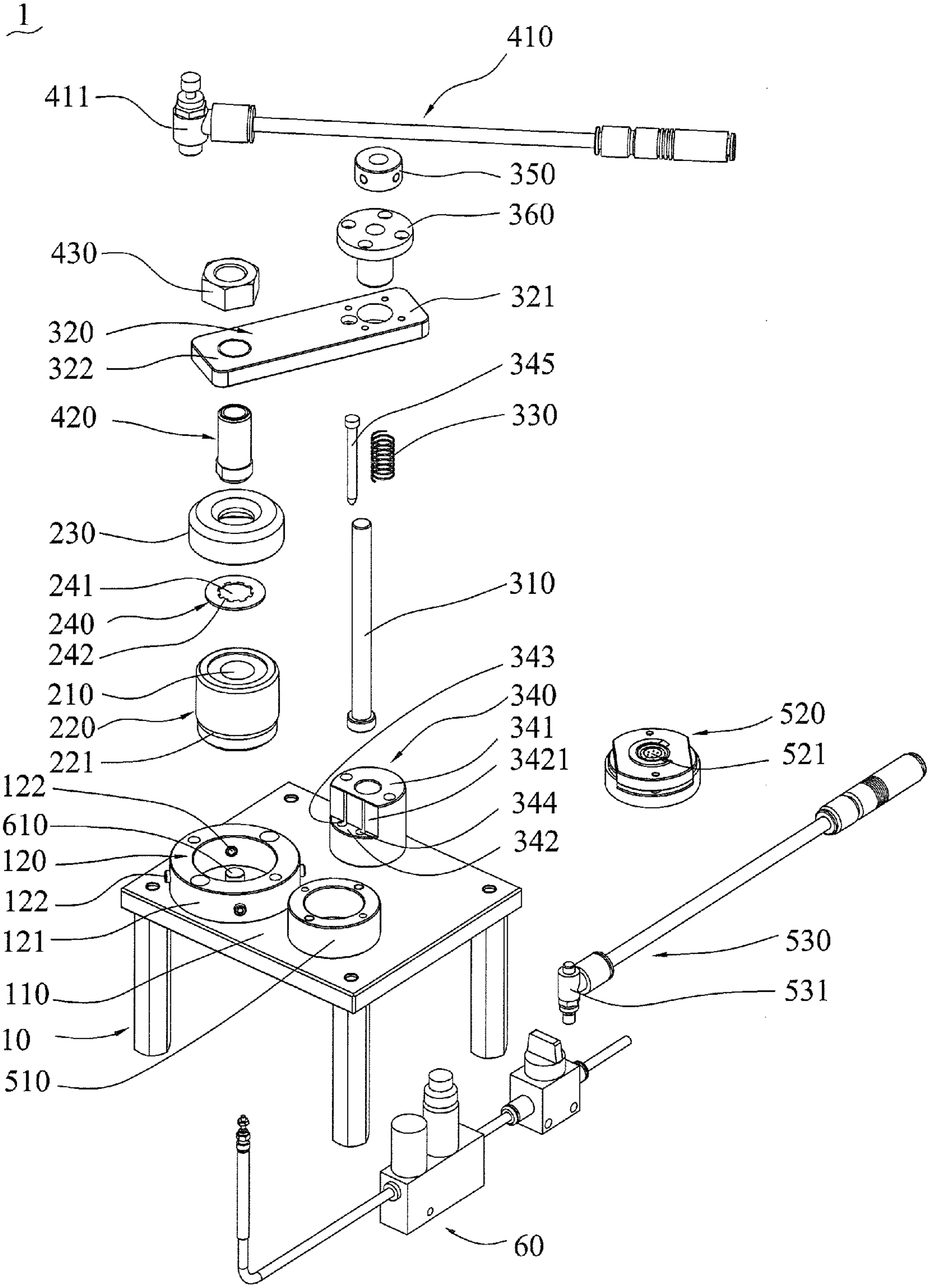
FIG. 2 illustrates an exploded stereogram of the sound film adsorption device shown in FIG. 1.

Firstly referring to illustrations of FIGS. 1 and 2, a sound film adsorption device according to the present invention includes a bracket 10, a sound film collect 20, a rotary mechanism 30 and a first absorbing mechanism 40. Meanwhile, the bracket 10 has a platform 110. Said sound film collect 20 is installed on the platform 110 and formed with a chamber 210 for placing a sound film therein. The rotary mechanism 30 includes a supporting post 310, a rotary plate 320 and a spring member 330. Said supporting post 310 is retained on the platform 110. The rotary plate 320 shaped in a cantilever-like has a joint end 321 moveably coupled to the supporting post 310. The spring member 330 is coupled with the supporting post 310 to abut against between platform 110 and the joint end 321 of the rotary plate. The first absorbing mechanism 40 includes a first vacuum generator 410 and an absorbing head 420, wherein the absorbing head 420 has an upper end extended through a nut 430 to communicate with the first nozzle 411 of the first vacuum generator 410, and a lower end extended through the 的 open end 322 of the rotary plate 320 to align with the chamber 210 of the sound film collect 20 so as to absorb the sound film placed within the sound film collect 20.

Preferably, the sound film collect 20 include a collect body 220 for placing the sound film and a collect cover 230 for engaging with said collect body 220, wherein a retaining shim 240 is disposed between the collect body 220 and the collect cover 230 and formed with a through hole 241 for allowing the sound film passing through. A circumferential edge of the through hole 241 of the retaining shim 240 is formed with a plurality of toothed segments 242 extended toward the inside of the through hole 241 and distributed in offsets along the through hole 241. Since the through hole 241 is identical to the sound film in dimension, the toothed segments 242 is disposed so as to obtain a proper resistant force to ensure that the sound films are separated in a single piece when the sound film is extracted from the sound film collect 20. In this embodiment, the retaining shim 240 can be a silicon film but does not limit to the silicon film. Any kind of highly flexible piece-like object also can be adopted.

Preferably, the platform 110 is disposed with a collect seat 120 retained thereon and having a lateral wall 121 formed with a plurality of retaining apertures each for inserting a corresponding locking bolt 122 therein. The sound film collect 20 has a circular groove 221 formed on an outer side thereof. When the sound film collect 20 is installed above the collect seat 120, the locking bolt 122 is extended through the corresponding retaining aperture to enter the circular groove 221 and thereby retaining the sound film collect 20 above the collect seat 120. Such a structure design brings the conveniences of retaining/dismounting the sound film collect 20 to/from the platform 110.

Preferably, the collect seat 120 is coupled with a pushing cylinder 60 on the downside thereof. The pushing cylinder 60 has a pushing head 610 extended through the platform 110 to enter the sound film collect 20 and then contact with the sound film placed within the sound film collect 20 so as to upwardly push the sound film in a manner that the uppermost one of the sound films in the sound film collect 20 is always maintained at the same position. The absorbing head 420 of the first absorbing mechanism 40 can provide a constant absorbing force to avoid damaging the structure of the absorbed sound film by an overmuch absorbing force. Thus, it can ensure the qualification of the sound film.

Preferably, the sound film adsorption device 1 further includes a second absorbing mechanism 50 which has an assembling seat 510, a sound film gauge 520 and a second vacuum generator 530. The assembling seat 510 is retained above the platform 110. The sound film gauge 520 is installed above the assembling seat 510. The second vacuum generator 530 is disposed on a downside of the assembling seat 510 and has a second nozzle 531 communicated with the sound film gauge 520. The open end 322 of the rotary plate 320 can be rotated toward an upside of the sound film gauge 520 in a manner of aligning the absorbing head 420 of the first absorbing mechanism 40 with the sound film gauge 520. The sound film gauge 520 includes an absorbing tray 521 formed with a plurality of vent holes and shaped to match the sound film in contour.

Preferably, the rotary mechanism 30 further includes an orientating seat 340, an orientating pin 345, a bearing 360 and a block 350. The orientating seat 340 has a stage structure including a first stage portion 341 and a second stage portion 342, wherein the first stage portion 341 is higher than the second stage portion 342. The first stage portion 341 of the orientating seat 340 is coupled to the supporting post 310 and retained above the platform 110. The bearing 360 is retained above the joint end 321 of the rotary plate 320 and is coupled to the supporting post 310, whereby the rotary plate 320 can be upwardly and downwardly moved along the supporting post 310 and pivot on the supporting post 310 in a horizontal plane. The spring member 330 is coupled to the supporting post 310 and is abutted against between the orientating seat 340 and the rotary plate 320. In this embodiment, said spring member 330 is implemented as a spring is coupled to the supporting post 310 and has two ends respectively abutting against the retaining seat and the bearing 360 of the rotary plate 320. The block 350 is fixedly coupled above the supporting post 310 and positioned above said bearing 360 so as to prevent the rotary plate 320 from departing from the supporting post 310 due to a flexible force effect from the spring member 330 or an improper manipulation when upwardly and downwardly moved.

The second stage portion 342 of the orientating seat 340 is formed with two orienting apertures 343, 344. The orientating pin 345 has an upper end retained on the rotary plate 320 and a lower end used to follow the rotation of the rotary plate 320 and selectively aligning with either of the orienting apertures 343, 344 for further insertion and orientation. Simultaneously, the orientating pin 345 contacts with a lateral side 3421 of the first stage portion 34 so as to prevent the rotary plate 320 from being rotated for further accomplishing an accurate alignment. By pressing the rotary plate 320 down, the lower end of the orientating pin 345 can be inserted into either of the orienting apertures 343, 344. As long as the orienting aperture 343 is inserted into, the absorbing head 420 of the first absorbing mechanism 40 can align with the chamber 210 of the sound film collect 20. As long as the orienting aperture 343 is inserted into, the absorbing head 420 can align with the absorbing tray 521 of the sound film gauge 520.

Figure 3:
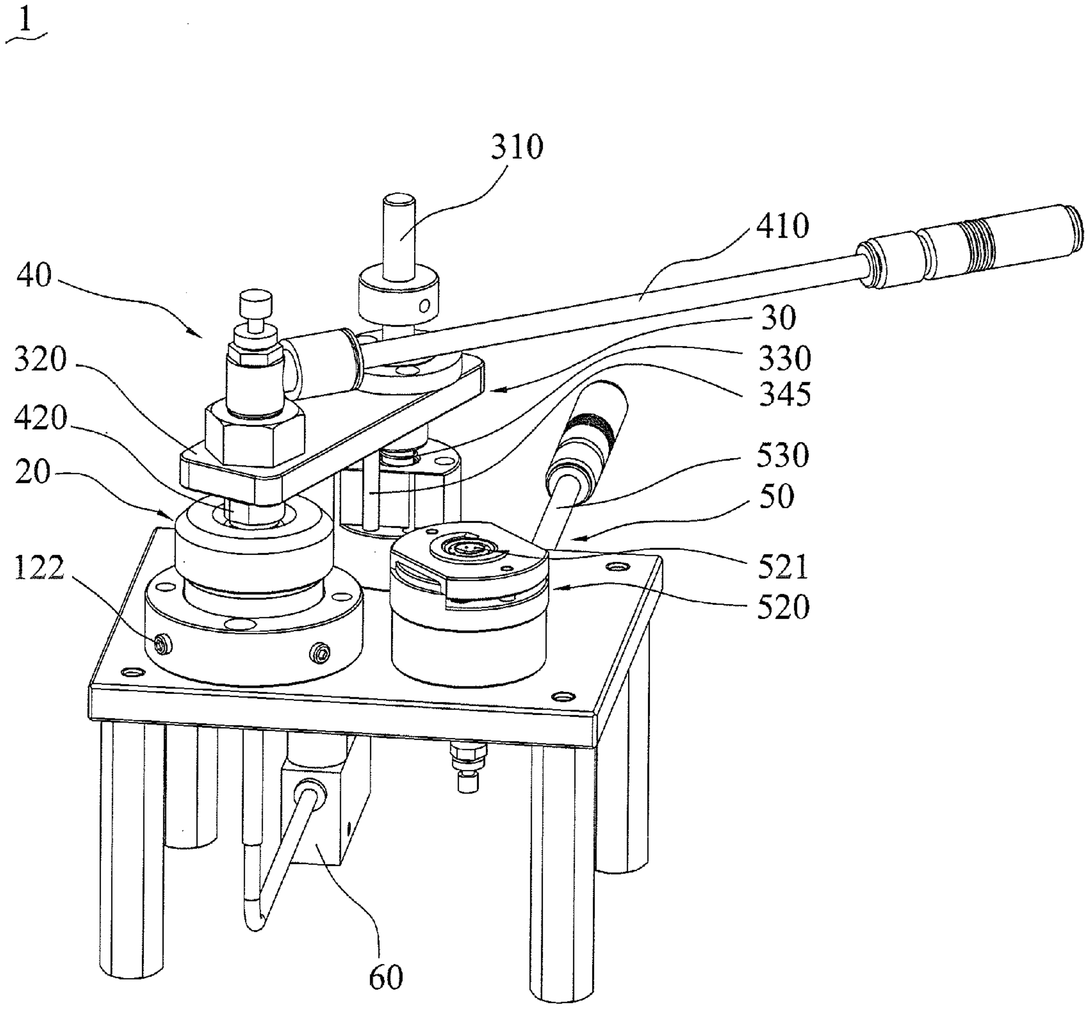
FIGS. 3, 4 and 5 illustrate the respective stereogram of the sound film adsorption device under different situations during a manipulating process.
Figure 4:
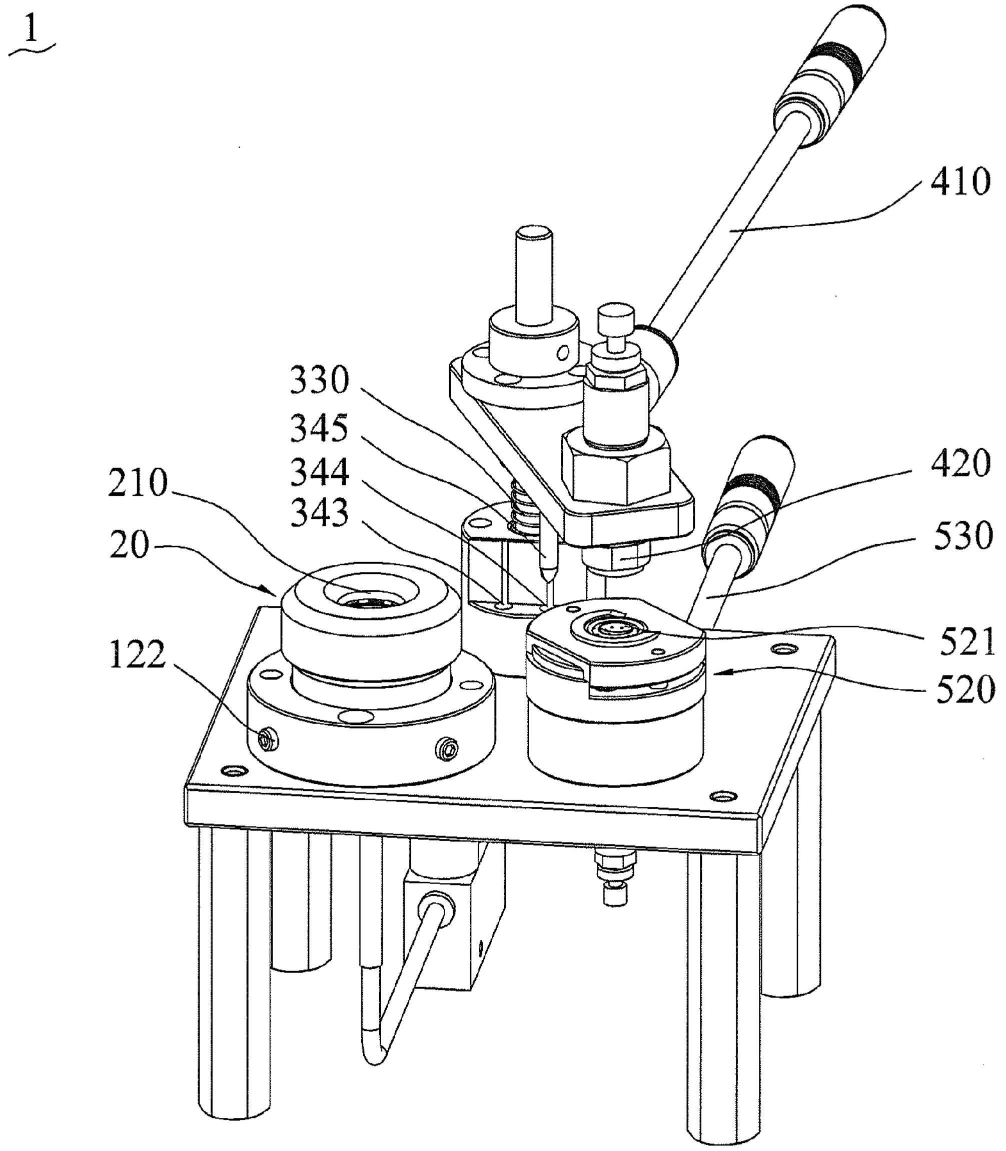
Figure 5:
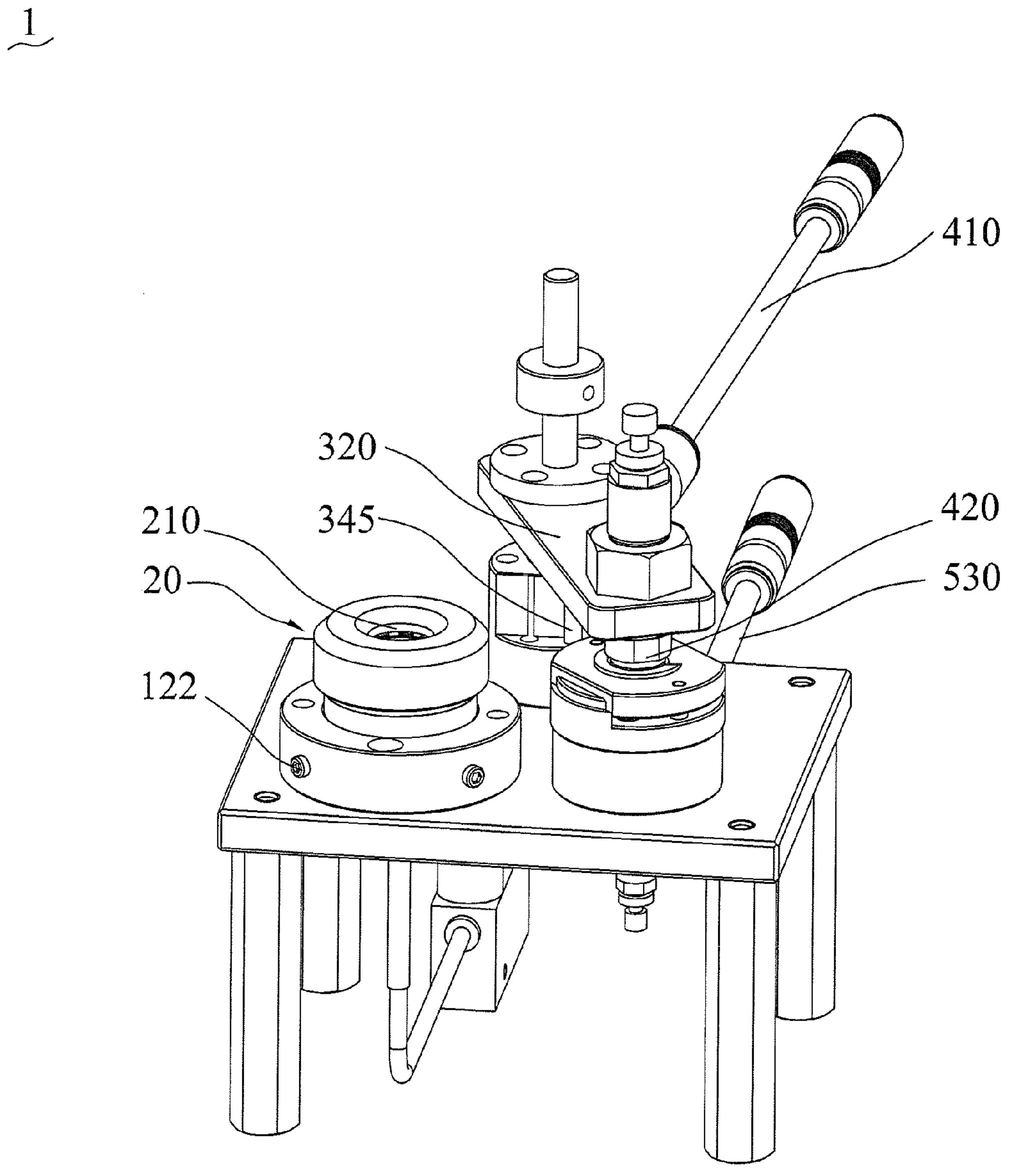

Further referring to illustrations of FIGS. 3, 4 and 5, a process of separating the sound films by the sound film adsorption device 1 according to the present invention separate is introduced as including the following steps of:

installing the sound film collect 20 filled with the sound films on the sound film seat and tightening the locking bolt 122 to the sound film seat; moving the rotary plate 320 of the rotary mechanism 30 to an extent that the orientating pin 345 aligns with the orienting aperture 343, and pressing said rotary plate 320 down so that the absorbing head 420 of the first absorbing mechanism 40 approaches the sound films in the sound film collect 20, and then turning on the first vacuum generator 410 to make the absorbing head 420 absorbing the uppermost one of the sound films in the sound film collect 20 and further the cylinder 60 pushing upwardly the sound films of the sound film collect 20; eliminating the downward compress applied on the rotary plate 320 so that by a resilient force effect of the spring member 330, the rotary plate 320 returns to a status before pressed; moving again the rotary plate 320 to make the orientating pin 345 aligning with the orienting aperture 344 align, and pressing said rotary plate 320 down so that the absorbing head 420 of the first absorbing mechanism 40 approaches the absorbing tray 521 of the sound film gauge 520, and then turning off the first vacuum generator 410; continuously turning on the second vacuum generator 530 so that the sound film is departed from the absorbing head 420 but absorbed by the absorbing tray 521 of the sound film gauge 520 for a next fabricating step. Accordingly, a single sound film separation is accomplished. By implementing the aforementioned steps in a loop, each of sound films in the sound film collect 20 can be separated, individually.

The above-mentioned separating process can be performed by a manual operation or accompanying a controlling system for accomplishing an automatic control.

In the sound film adsorption device 1 according to the present invention, the first vacuum generator 410, the second vacuum generator 530, the pushing cylinder 60 and the other components all are well-known for a person skilled in the art and therefore not restated in structure. Please note that the first vacuum generator 410 and the second vacuum generator 530 can be implemented with any one prior vacuum generator suited for installing within the sound film adsorption device 1 of the present invention. In other application, the first vacuum generator 410 and the second vacuum generator 530 can be the same or different product models.

In conclusion, the sound film adsorption device 1 according to the present invention utilizes the vacuum-absorbing approach to separate the sound films and thereby achieving a better efficiently separation effect and ensuring the qualification of the sound film.

It is to be understood, however, that even though numerous characteristics and advantages of the present invention have been set fourth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A sound film adsorption device, comprising:

a bracket having a platform;

a sound film collect installed on the platform and formed with a chamber for placing a sound film therein;

a rotary mechanism including a supporting post, a rotary plate and a spring member, wherein the supporting post is retained on the platform, and the rotary plate shaped in a cantilever-like has an end moveably coupled to the supporting post and the other end being an open end, and the spring member is couple to the supporting post and abutted against between the platform and the rotary plate;

a first absorbing mechanism including a first vacuum generator and an absorbing head having an end communicated with the first vacuum generator and the other end extended through the open end of the rotary plate to align with the chamber of the sound film collect so as to absorb the sound film placed within the sound film collect, and a pushing cylinder having a pushing head and located on a downside of the sound film collect, and the pushing head being extended through the platform to enter the sound film collect and then contacted with the sound films placed within the sound film collect so as to upwardly pushing the sound film.

2. The sound film adsorption device as described in claim 1, wherein said platform is disposed with a collect seat retained thereon and having a lateral wall formed with at least one retaining aperture for inserting a locking bolt, and the sound film collect has an outer side formed with a circular groove, whereby the locking bolt is extended through the retaining aperture to enter the circular groove so as to install the sound film collect with the collect seat.

3. The sound film adsorption device as described in claim 1, wherein the sound film collect includes a collect body for placing the sound film therein and an collect cover for locking in the collect body, and a retaining shim is disposed between the collect body and the collect cover and is formed with a through hole for the sound film passing through, of which a circumferential edge is formed with a plurality of toothed segments extended toward the inside of the through hole.

4. The sound film adsorption device as described in claim 3, wherein the toothed segments are distributed in offsets along the through hole.

5. The sound film adsorption device as described in claim 1, further comprising a second absorbing mechanism having an assembling seat retained on the platform, a sound film gauge installed on the assembling seat, and a second vacuum generator installed on a downside of the assembling seat and communicated with the sound film gauge, whereby the open end of the rotary plate can be rotated toward an upside of the sound film gauge so that the absorbing head aligns with the sound film gauge.

6. The sound film adsorption device as described in claim 5, wherein the sound film gauge includes an absorbing tray formed with a plurality of vent holes and shaped to match the sound film in contours.

7. The sound film adsorption device as described in claim 5, wherein the rotary mechanism further includes an orientating seat formed with two orienting apertures and an orientating pin for inserting into either of the orienting apertures, wherein the orientating seat is coupled to the supporting post and is retained on the platform, and the spring member is coupled to the supporting post and is abutted against between the orientating seat and the rotary plate, and the orientating pin has an end retained on the rotary plate and the other end for selectively aligning the two orienting apertures for further insertion and orientation.

8. The sound film adsorption device as described in claim 7, wherein the orientating seat has a stage structure including a first stage portion and a second stage portion lower than the first stage portion, wherein the supporting post is extended through the first stage portion, and the orienting aperture is formed on the second stage portion, and the orientating pin contacts with a lateral side of the first stage portion when aligning with the orienting aperture.

9. The sound film adsorption device as described in claim 1, wherein the rotary mechanism further includes a block is fixedly coupled to the supporting post and located above the rotary plate.

10. The sound film adsorption device as described in claim 2, wherein the rotary mechanism further includes a block is fixedly coupled to the supporting post and located above the rotary plate.

11. The sound film adsorption device as described in claim 3, wherein the rotary mechanism further includes a block is fixedly coupled to the supporting post and located above the rotary plate.

12. The sound film adsorption device as described in claim 4, wherein the rotary mechanism further includes a block is fixedly coupled to the supporting post and located above the rotary plate.

13. The sound film adsorption device as described in claim 1, wherein the rotary mechanism further includes a block is fixedly coupled to the supporting post and located above the rotary plate.

14. The sound film adsorption device as described in claim 5, wherein the rotary mechanism further includes a block is fixedly coupled to the supporting post and located above the rotary plate.

15. The sound film adsorption device as described in claim 6, wherein the rotary mechanism further includes a block is fixedly coupled to the supporting post and located above the rotary plate.

16. The sound film adsorption device as described in claim 7, wherein the rotary mechanism further includes a block is fixedly coupled to the supporting post and located above the rotary plate.

* * * * *